(12) United States Patent
Hudelot et al.

(10) Patent No.: US 8,817,939 B2
(45) Date of Patent: Aug. 26, 2014

(54) METHOD TO PROCESS FISSION CHAMBER MEASUREMENT SIGNALS

(75) Inventors: Jean-Pascal Hudelot, Greoux les Bains (FR); Jean-Michel Girard, Aix-en-Provence (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 1097 days.

(21) Appl. No.: 12/809,570

(22) PCT Filed: Dec. 22, 2008

(86) PCT No.: PCT/EP2008/068172
§ 371 (c)(1),
(2), (4) Date: Jun. 18, 2010

(87) PCT Pub. No.: WO2009/083536
PCT Pub. Date: Jul. 9, 2009

(65) Prior Publication Data
US 2010/0310033 A1  Dec. 9, 2010

(30) Foreign Application Priority Data
Dec. 24, 2007  (FR) ...................................... 07 60331

(51) Int. Cl.
*G21C 17/00* (2006.01)
*G21C 17/06* (2006.01)

(52) U.S. Cl.
CPC .............. *G21C 17/063* (2013.01); *G21C 17/06* (2013.01); *G21C 17/00* (2013.01)
USPC ........................................... 376/257; 376/245

(58) Field of Classification Search
CPC ....... G21C 17/00; G21C 17/06; G21C 17/063
USPC ......................................... 376/245, 257, 259
See application file for complete search history.

(56) References Cited

PUBLICATIONS

Moore, M.S. et al., "Neutron-Induced Fission Cross Section of 244 Pu", IEEE, Nuclear Physics A393, North-Holland Publishing Company, pp. 1-14 (Jan. 24, 1983).
International Search Report, PCT/EP2008/068172, dated Apr. 1, 2009.

*Primary Examiner* — Jack W Keith
*Assistant Examiner* — Marshall O'Connor
(74) *Attorney, Agent, or Firm* — Nixon Peabody LLP (57) ABSTRACT

A method to determine the effective masses of deposits of fissile matter, including a first measuring step to measure the count rate of deposits of fissile matter of known effective masses to form a matrix $[C]_0$, a second measuring step to measure the count rate of deposits of fissile matter to form a matrix $[C]$, and a computing step to calculate the effective masses to be determined.

6 Claims, 5 Drawing Sheets

METHOD TO PROCESS FISSION CHAMBER MEASUREMENT SIGNALS

CROSS REFERENCE TO RELATED APPLICATIONS OR PRIORITY CLAIM

This application is a national phase of International Application No. PCT/EP2008/068172, entitled "METHOD OF PROCESSING FISSION CHAMBER MEASUREMENT SIGNALS", which was filed on Dec. 22, 2008, and which claims priority of French Patent Application No. 07 60331, filed Dec. 24, 2007.

DESCRIPTION

Technical Area and Prior Art

The present invention relates to the area of non-destructive measuring techniques.

More precisely, the invention concerns a method to process measurement signals delivered by a fission chamber and obtained by active neutron interrogation.

The processing method of the invention is particularly well adapted to the processing of raw signals delivered by a fission chamber calibration device such as a device subject of a patent application filed on this same day by the Applicant and titled "Device to measure count rates and associated fission chamber calibration device", these devices being recalled in the present application.

Fission chambers are used to detect neutrons. A fission chamber contains fissile matter and a gas able to be ionized. Under the action of neutrons, the fissile matter emits particles which ionize the gas. The quantity of ionized gas translates the quantity of neutrons received in the fission chamber. Only part of the fissile matter, called the "effective mass" takes part in the emission of particles which ionize the gas. In practice, precise knowledge of the effective mass is necessary to determine absolute physical magnitudes i.e. the neutron flux or spectral indices. The processing method of the invention can be used to calculate the effective mass of the fissile isotope from measurements delivered by a calibration device such as the device mentioned above.

Up to date, the calibration of fission chambers is conducted in a nuclear reactor either in a thermal spectrum (or thermal column) or a fission spectrum. Numerous calibration methods have been developed in this respect. These methods all require the use and availability of a research reactor. For safety reasons, these methods require the setting up of cumbersome experimental procedures and are therefore costly. In addition, research reactors provided with calibration devices are becoming increasingly less numerous worldwide, hence the need to travel if it is desired to calibrate a fission chamber.

The processing method of the invention allows the reliable, precise, controlled determination of the effective masses of fission chambers, without the above-mentioned disadvantages.

DISCLOSURE OF THE INVENTION

The invention concerns a method to determine the effective masses of N deposits of fissile matter respectively placed in N measurement fission chambers, N being an integer of 1 or higher, characterized in that it comprises:

A) a first measuring step in which the count rate is measured of N deposits of fissile matter of known effective masses respectively placed in N calibration fission chambers that are respectively identical regarding their outer dimensions to the N measurement fission chambers, to form a matrix $[C]_0$ of count rates of known fissile matter deposits, B) a second measuring step during which the count rate is measured of N deposits of fissile matter placed in the N measurement fission chambers, to form a matrix $[C]$ of count rates of the fissile matter deposits, the second measuring step being conducted under identical measuring conditions to the measuring conditions under which the first measuring step is conducted, and C) a computing step to calculate a column matrix $[m]$ such that:

$$[m]=[C]\cdot I([a]\times([a]_0^{-1}\times[m]_0^{-1}\times[C]_0)),$$

the coefficients of the matrix $[m]$ being the effective masses to be determined, the symbols "·I" and "×" respectively being the "matrix division" operator and the "matrix product" operator, and the matrices $[a]$, $[a]_0^{-1}$ and $[m]_0^{-1}$ respectively being:

matrix $[a]$, a known matrix of the isotopic analyses associated with the N deposits of fissile matter whose effective masses are to be determined, matrix $[a]_0^{-1}$, an inverse matrix of a known matrix $[a]_0$ of the isotopic analyses associated with the N deposits of fissile matter of known effective masses, matrix $[m]_0^{-1}$, an inverse matrix of a known matrix $[m]_0$ whose coefficients are the known effective masses of the N known deposits of fissile matter.

According to an additional characteristic of the method of the invention, a variance matrix var$[m]$ of matrix $[m]$ is calculated, such that:

$$\mathrm{var}[m]=\{\mathrm{var}[C]+[m_{ij}^2]\times(\mathrm{var}[a]\times[X_{ij}^2]+[a_{ij}^2\times\mathrm{var}[X]])\}\cdot I\{([a]\times[X])_{ij}^2]\},$$

in which:

var$[C]$ is the variance matrix of matrix C,
var$[a]$ is the variance matrix of matrix $[a]$,
var$[X]$ is the variance matrix of matrix $[X]$ such that:

$$[X]=[a]_0^{-1}\times[m]_0^{-1}\times[C]_0,$$

$[m_{ij}^2]$ is the matrix consisting of the terms $m_{ij}$ to the power of 2, the terms $m_{ij}$ being the coefficients of matrix $[m]$, i being the index relating to the rows of the matrix and j being the index relating to the columns of the matrix, $[a_{ij}^2]$ is the matrix consisting of the terms $a_{ij}$ to the power of 2, the terms $a_{ij}$ being the coefficients of matrix $[a]$, i being the index relating to the rows of the matrix and j being the index relating to the columns of the matrix, $[X_{ij}^2]$ is the matrix consisting of the terms $X_{ij}$ to the power of 2, the terms $X_{ij}$ being the coefficients of matrix $[X]$, i being the index relating to the rows of the matrix and j being the index relating to the columns of the matrix, $[([a]\times[X])_{ij}^2]$ is the matrix consisting of the terms $([a]\times[X])_{ij}$ to the power of 2, the terms $([a]\times[X])_{ij}$ being the coefficients of the product matrix $[a]\times[X]$, i being the index relating to the rows of the matrix and j being the index relating to the columns of the matrix.

In substance, the invention comprises three parts:

a) Equating the problem which, via a matrix equation system, allows the count rate recorded for the fission chambers to be expressed in relation to the effective masses, to the isotopic compositions of the chambers, and to the effective macroscopic fission cross-sections per unit of mass of the isotopes in the neutron spectrum with respect to the considered configuration of the calibration device, b) Primary calibration intended to determine the effective macroscopic cross-sections per unit of mass of the different isotopes of interest in a given configuration of the calibration device (this step requires the use of primary standard fission chambers whose effective mass and isotope compositions are accurately known, these primary standards then possibly being derived from specific fabrication or having been previously calibrated in another calibration device (e.g. a reactor), c) A secondary calibration which, with knowledge of the isotope compositions and count rates obtained in the calibration device by active neutron interrogation, allows determination of the effective mass of the main isotope contained in the fission chambers.

The processing method of the invention, for all actinides and using a calibration device in fast neutron configuration, allows calibration accuracies to be obtained that are equivalent to those obtained in a reactor.

For a calibration device in thermal neutron configuration, the processing method of the invention allows accuracies to be obtained which are equivalent to those obtained in a reactor for fissile isotopes with thermal neutrons.

BRIEF DESCRIPTION OF THE FIGURES

Other characteristics and advantages of the invention will become apparent on reading a preferred embodiment with reference to the appended figures, among which.

In all the figures, the same references designate the same parts.

DESCRIPTION OF A PREFERRED EMBODIMENT OF THE INVENTION

FIGS. 1-4, as a non-limiting example, show a fission chamber count rate measuring device, which delivers count rate measurements able to be processed using the method of the invention.

Figure 1:
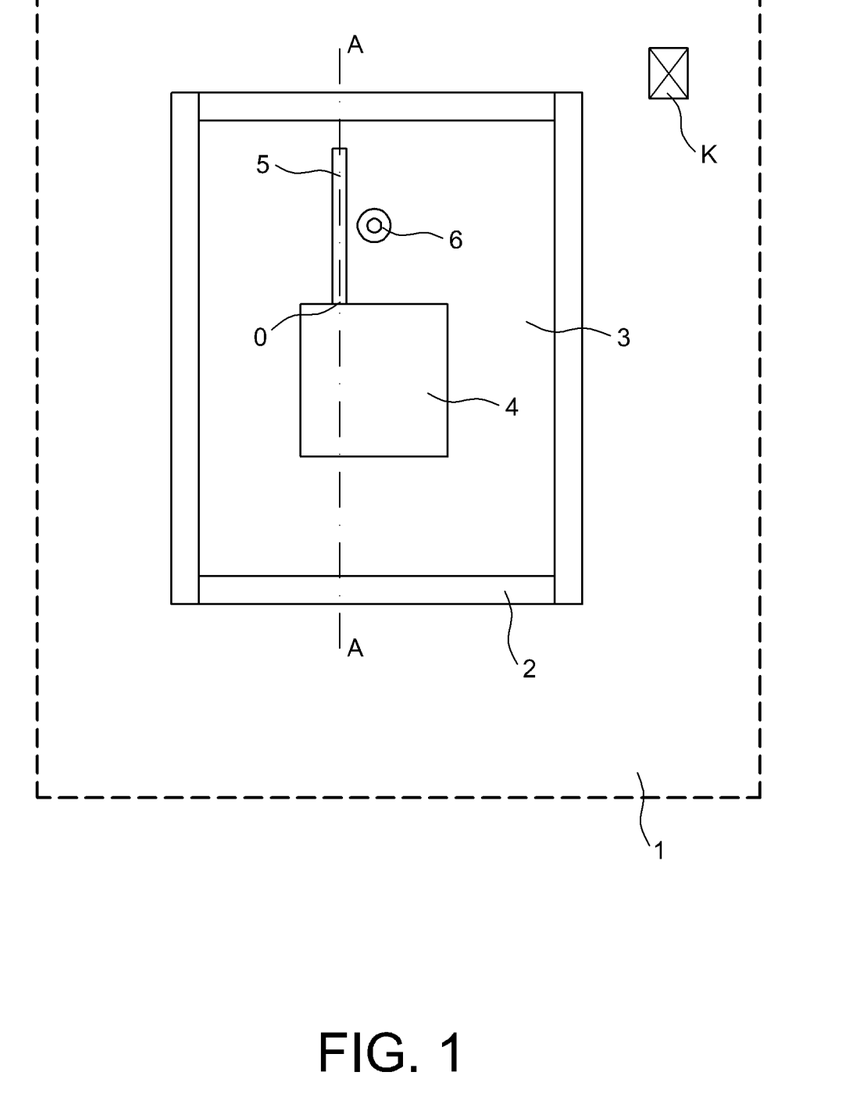
FIG. 1 gives a block diagram of a measurement cell which is part of a count rate measuring device which delivers measurement signals capable of being processed using the method of the invention.

FIG. 1 illustrates a measurement cell which takes part in the count rate measuring device. The measurement cell 1 consists of an enclosure 2 which contains a material 3 in which a cavity 4 is formed, and of a neutron counter K. The material forming the enclosure 2 is polyethylene for example, and the material 3 is graphite for example. A longitudinal cavity 5 able to receive a fission chamber is formed inside the material 3. A neutron generator 6 is placed in the material 3 in the vicinity of the cavity 5. The cylindrical cavity 5 opens into cavity 4 via an opening O. In the embodiment shown in FIG. 1, the neutron counter K is placed next to the enclosure 2. The invention also concerns the case in which the neutron counter is located inside the enclosure 2.

Figure 2:
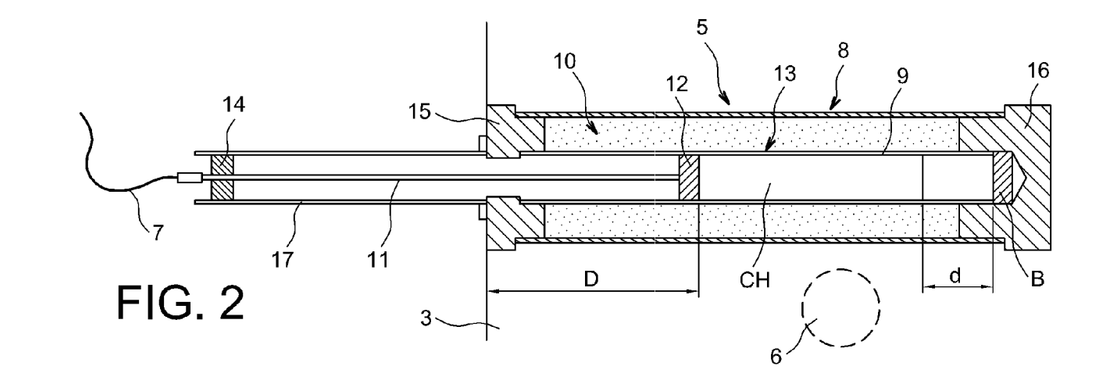
FIG. 2 shows a partial cross-sectional view of a first example of a structure which takes part in a count rate measuring device which delivers measurement signals able to be processed using the method of the invention.

FIG. 2 is a partial cross-sectional view of a first exemplary structure which takes part in the count rate measuring device.

The structure shown in FIG. 2 is intended to obtain a fast neutron spectrum. The cavity 5 contains two coaxial cylindrical housings 8, 9, housing 8 surrounding housing 9. The housings 8 and 9 are in stainless steel, for example, and 1 mm thick. A foil of material 13 e.g. a cadmium foil 1 mm thick, covers the outer face of the cylinder 9. The function of the foil material 13 is to capture the thermal neutrons i.e. the neutrons whose energy is less than 0.625 eV. A block of material 10 is placed in the space which separates the foil of material 13 from the housing 8. The material 10 e.g. borolene (i.e. boron and polyethylene) has a thickness of 16 mm for example. Two alignment bushings 15 and 16 hold in place and align the cylindrical housings 8 and 9 inside the cavity 5. An abutment B closes the cavity on the side of the alignment bushing 16. The fission chamber CH is placed inside the cylindrical housing 9. A first end of the fission chamber is connected to a connection element 12 which collects the electrons created by ionization of the gas contained in the chamber. This first end of the fission chamber is placed at a distance D from the opening O, the other end of the chamber being placed at a distance d from the abutment B. The connection element 12 is connected to a rigid coaxial cable 11. A cylindrical tube 17 for example a tube in stainless steel 1 mm thick aligned with the cylindrical housing 9 is placed in cavity 4. An alignment bushing 14 holds the rigid coaxial cable 11 in the cylindrical tube 17. A connector connects the rigid coaxial cable 11 to a flexible measuring cable 7 which transmits the signal towards processing circuits (not shown in FIG. 2; see FIG. 3).

The guide and positioning system consisting of elements 14, 15 and 16 advantageously guarantees good reproducibility of the axial position and radial alignment of the chamber CH. The accuracy obtained for this position can be in the order of 1 mm for example, even less. Also the fission chamber CH, the connection element 12 and the coaxial cable 11 are capable of moving longitudinally inside the cylindrical tube 9. The longitudinal movement of the fission chamber advantageously allows an optimal position of the chamber to be sought, namely the position in which measurement results correspond to maximum flux.

The materials and dimensions of the structure of the invention illustrated in FIG. 2 are preferably obtained using the Monte-Carlo N-Particle calculation code. It is precisely with this calculation code that the materials and dimensions mentioned above were obtained. However, other materials having equivalent characteristics could also be chosen to form this structure. The choice of these other materials would then entail different sizing to obtain substantially equivalent performance levels. The materials mentioned above allow a calibration device to be formed which has "acceptable" dimensions i.e. a device that is neither too voluminous nor too cumbersome. The choice of stainless steel for the cylindrical housings 8, 9 and 17 is able to impart excellent rigidity to the entire device and to guarantee resistance to wear. The choice of borolene is warranted through the good resistance of this material to ageing, through its efficacy in terms of thermal neutron capture and its low cost.

The alignment device 14, 15, 16 of the fission chamber is specific for each chamber diameter considered. The alignment bushings 14, 15 16 and the abutment B are in stainless steel for example. The diameters of the alignment bushings and the machining of the abutment B are adapted to the diameter of the rigid coaxial cable 11.

In the structure described above, only those neutrons which are not slowed down/thermalized in the graphite of the cell and in the borolene enter inside the fission chamber. Therefore the fission chamber only sees the fast neutrons emitted by the generator 6, i.e. those neutrons which have not undergone any interaction.

Figure 3:
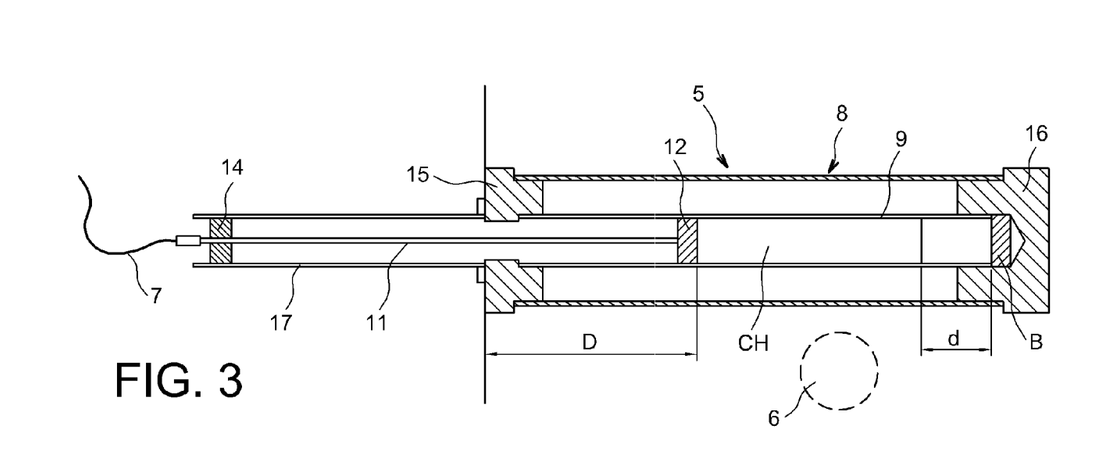
FIG. 3 is a partial cross-sectional view of a second example of a structure which takes part in a count rate measuring device which delivers measurement signals able to be processed using the method of the invention.

FIG. 3 is a partial cross-sectional view of a second exemplary structure which takes part in the count rate measuring device. The structure in FIG. 3 is adapted to obtaining a thermal neutron spectrum. The cavity 5 comprises all the constituent elements already described with reference to FIG. 2, with the exception of the block of material 10 and the cadmium foil 13. The space between the housings 8 and 9 here is filled with air. As previously, the position of the fission chamber can be adjusted longitudinally using sliding means as mentioned previously for example.

The neutrons derived from the generator 6 here are able to enter the fission chamber irrespective of their energies. However, these neutrons beforehand pass through a thickness of graphite of between 0 cm and about 40 cm for example, depending on the position taken up by the fission chamber in the housing 9, making it possible to discriminate between their energy in relation to their time of arrival at the fission chamber i.e. in relation to the graphite thickness through which they have passed. As a non-limiting example, the calculations made using the Monte-Carlo MCNP4C2 code have shown that more than 99.9% of the neutrons emitted by a neutron generator with a firing frequency of 125 Hz, after each firing, are thermal neutrons over a time range ranging from between 700 μs as and 3,500 μs, irrespective of the axial position of the chamber in the calibration device.

Figure 4:
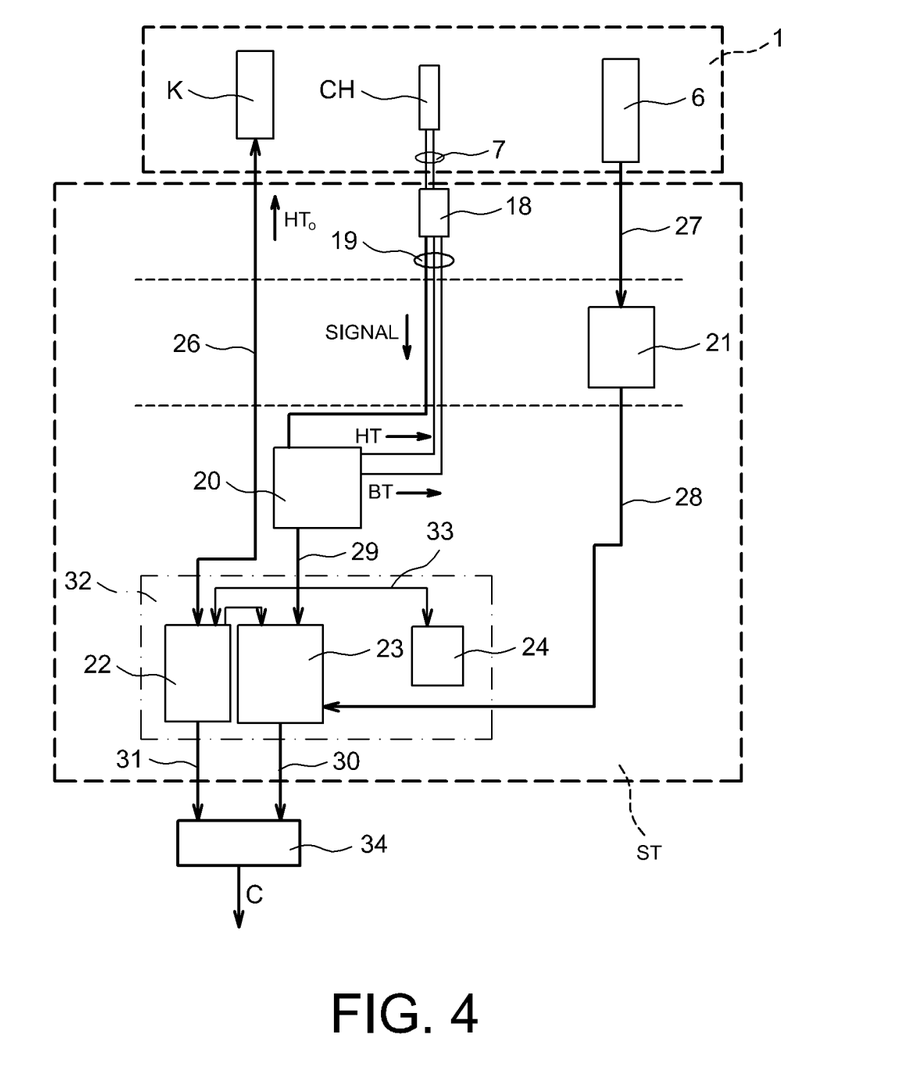
FIG. 4 is a block diagram of a count rate device for fission chamber which delivers measurement signals able to be processed by the method of the invention.

FIG. 4 is a block diagram of the fission chamber count rate measuring device. The measuring device comprises:

a measurement cell 1 such as described above, in which a fission chamber CH, a neutron generator 6 and a neutron counter K are integrated, a processing system ST to process signals delivered by the fission chamber CH and by the counter K, and which delivers firstly a signal representing a signal delivered by the fission chamber and secondly a signal representing the signal delivered by the counter K, and a computing circuit 34 which calculates the count rate C of the fission chamber standardized, with respect to the signal delivered by the counter K, using signals delivered by the processing system ST.

The processing system ST comprises:

a preamplifier 18 which amplifies the signal delivered via the measuring cable 7 by the fission chamber CH, an amplifier 20 connected to the preamplifier 18 by a multiconductor cable 19 which transmits a high voltage HT and low voltage BT towards the fission chamber CH, an electronic circuit 21 connected via a cable 27 to the neutron generator 6, an acquisition circuit 32 which comprises an amplifier 22, an acquisition board 23 and a high voltage circuit 24, the amplifier 22 via a cable 26 receiving the signal delivered by the counter K and via an electric connection 33 receiving the high voltage delivered by circuit 24, the cable 26 supplying high voltage $HT_0$ to the counter K, the acquisition board 23 via an electric connection 29 receiving the signal delivered by the amplifier 20 and via an electric connection 28 receiving the signal delivered by the electronic circuit 21, the amplifier 22 delivering the signal representing the signal delivered by the counter K, and the acquisition board 23 delivering the signal representing the signal delivered by the fission chamber.

As a non-limiting example, the count rate measuring device illustrated in FIG. 4 only contains a single fission chamber. More generally, a count rate measuring device contains N fission chambers, N being an integer of 1 or more.

Figure 5:
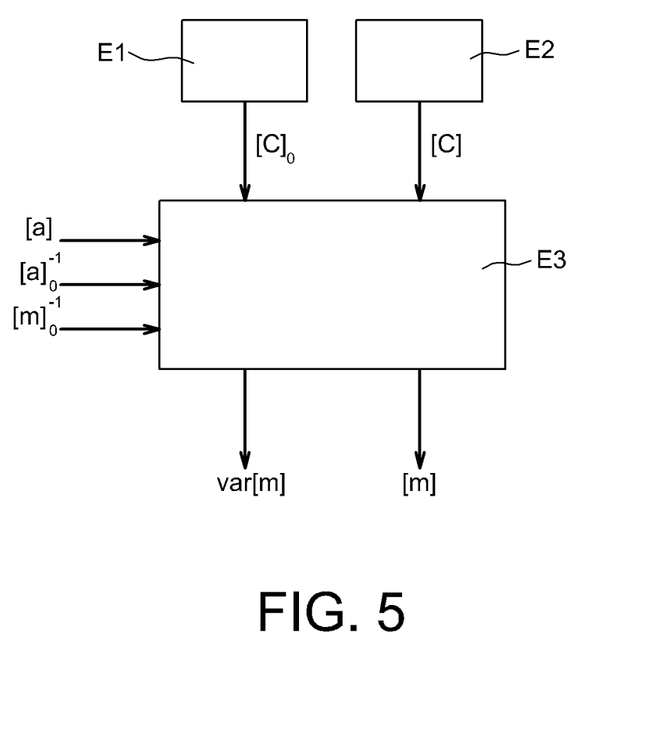
FIG. 5 is a block diagram of the method to process measurement signals according to the invention.

FIG. 5 gives a block diagram of the method to determine effective mass conforming to the invention. The method is described for the general case in which N effective masses of N fissile deposits contained in N measurement fission chambers are calculated simultaneously. Each fissile deposit contains a main isotope and impurities.

The method of the invention firstly comprises two measuring steps E1 and E2. Step E1 is a step to measure the count rates of N deposits of fissile matter of known effective masses placed in N calibration fission chambers respectively identical to the N measuring fission chambers, and step E2 is a step to measure the count rates of N deposits of fissile matter whose effective masses are to be determined. By "identical" fission chamber is meant fission chambers whose outer dimensional characteristics (chamber diameter and length) are identical to the nearest manufacturing tolerances, the other characteristics not necessarily being identical. Step E1 leads to the formation of a matrix $[C]_0$ which is the matrix of the measured count rates of N deposits of fissile matter of known effective masses, and step E2 leads to the formation of a matrix $[C]$ which is the matrix of the measured count rates of the N deposits of fissile matter whose effective masses are to be determined. The matrices $[C]_0$ and $[C]$ are formed for example from standardized count rate measurements delivered by a device conforming to the device shown in FIG. 4. During steps E1 and E2, the measured count rates are obtained under identical measuring conditions. By "identical measuring conditions" is meant that, in both cases, the fission chamber occupies an identical position in the measuring cell, that the configuration of measurements is identical (fast neutrons or thermal neutrons) and the time range over which the measurements are made is identical.

Steps E1 and E2 are followed by a step E3 to calculate a matrix $[m]$ such that:

$$[m]=[C]\cdot I([a]\times([a]_0^{-1}\times[m]_0^{-1}\times[C]_0)) \quad (1),$$

in which the symbols "·I" and "×" respectively represent the "matrix division" operator and the "matrix multiplication" operator.

Matrix $[m]$ is a column matrix whose coefficients are the effective masses it is sought to determine.

Matrices $[a]$, $[a]_0^{-1}$ and $[m]_0^{-1}$ are known matrices:

matrix $[a]$ is the matrix of the isotopic analyses of the N deposits of fissile matter contained in the N fission chambers, standardized with respect to the main isotopes, matrix $[a]_0^{-1}$ is the inverse matrix of matrix $[a]_0$ of the isotopic analyses of the N known deposits of fissile matter, and matrix $[m]_0^{-1}$ is the inverse matrix of the column matrix $[m]_0$ formed from the N known effective masses associated with the N known deposits of fissile matter.

Using the known matrices $[a]$, $[a]_0^{-1}$ and $[m]_0^-$ and using the matrices $[C]$ and $[C]_0$ constructed from the measurements indicated above, it then becomes possible to calculate matrix $[m]$ (cf. equation (1)).

In addition to matrix $[m]$, the computing step E3 also calculates the matrix of variances $[\text{var}(m)]$, in which $\text{var}(m)$ represents the variance of the effective mass m. The equation of the variance matrix is explained below.

Assuming the independence of the coefficients of matrices $[a]_0^{-1}$, $[m]_0^{-1}$ and $[C]_0$, the variance matrix of matrix m is written:

$$\text{var}[m]=\{\text{var}[C]+[m_{ij}^2]\times(\text{var}[a]\times[X_{ij}^2]+[a_{ij}^2]\times\text{var}[X])\}\cdot I\{[([a]\times[X]_{ij}^2]\} \quad (2),$$

in which:

var[C] is the variance matrix of matrix C, var[a] is the variance matrix of matrix [a], var[X] is the variance matrix of matrix [X] such that:

$$[X]=[a]_0^{-1} \times [m]_0^{-1} \times [C]_0 \quad (3),$$

$[m_{ij}^2]$ is the matrix consisting of the terms $m_{ij}$ to the power of 2, the terms $m_{ij}$ being the terms of matrix [m], i being the index relating to the rows of the matrix and j being the index relating to the columns of the matrix, $[a_{ij}^2]$ is the matrix consisting of the terms $a_{ij}$ to the power of 2, the terms $a_{ij}$ being the terms of matrix [a], i being the index relating to the rows of the matrix and j being the index relating to the columns of the matrix, $[X_{ij}^2]$ is the matrix consisting of the terms $X_{ij}$ to the power of 2, the terms $X_{ij}$ being the terms of matrix [X], i being the index relating to the rows of the matrix and j being the index relating to the columns of the matrix, $[([a] \times [X])_{ij}^2]$ is the matrix consisting of the terms $([a] \times [X])_{ij}$ to the power of 2, the terms $([a] \times [X])_{ij}$ being the terms of the product matrix $[a] \times [X]$, i being the index relating to the rows of the matrix and j being the index relating to the columns of the matrix.

In general, a fission chamber with main isotope i contains impurities. In practice, U-234 and U-236 impurities are often present in negligible quantity in Uranium U-233, U-235 or U-238 chambers and therefore do not give rise to any problem. With regard to Pu-238 chambers for example, the U-234 impurity is a product of the radioactive decay of Pu-238 with a period of 87.7 years. With a sufficiently recent Pu-238 chamber therefore the quantity of U-234 will be negligible.

In cases in which it is not possible to neglect impurities, the method of the invention advantageously takes their influence into account. The calculated coefficients of matrix [m] are then equivalent effective masses which, in addition to the effective masses of the main isotopes, take into consideration the effective masses of the impurities present in the fission chamber. As an indicative example, the expression of an equivalent effective mass of a main isotope Pu-238 containing U-234 impurities will now be given.

The equivalent number Neq of nuclei of the Pu-238 isotope contained in a fission chamber is calculated using the following equation:

$$N_{eq} = \left( N_4 \times \frac{\sigma_{4,c}}{\sigma_{8,c}} + N_8 \right)$$

in which:

$N_4$ is the number of U-234 nuclei contained in the chamber and known from analysis, $N_8$ is the number of Pu-238 nuclei contained in the chamber and known from analysis, $\sigma_{4,c}$ is the effective microscopic fission cross-section of the impurity U-234, calculated using the MCNP4C2 code for example, under the measurement conditions (counting time interval and fast or thermal neutron spectrum under consideration), $\sigma_{8,c}$ is the effective microscopic fission cross-section of Pu-238, calculated using the MCNP4C2 code for example, under the measurement conditions (counting time interval and fast or thermal type of the neutron spectrum under consideration).

The equivalent effective mass $m_{eq}$ of Pu-238 which is taken into account as coefficient of the matrix [m] is then given by the following formula:

$$m_{eq} = m_4 \times \frac{238}{234} \times \frac{\sigma_{m4c}}{\sigma_{m8c}} + m_8$$

in which:

$m_4$ is the effective mass of U-234 in the chamber, 238 is the mass number of Pu-238, 234 is the mass number of U-234, $\sigma_{m4c}$ is the effective microscopic fission cross-section per unit of mass of U-234, calculated using the MCNP4C2 code for example, under the measurement conditions (counting time interval and fast or thermal type of the neutron spectrum under consideration), $\sigma_{m8c}$ is the effective microscopic fission cross-section per unit of mass of Pu-238, calculated using the MCNP4C2 code for example, under the measurement conditions (counting time interval and fast or thermal type of the neutron spectrum under consideration), $m_8$ is the effective mass of Pu-238 in the chamber.

Figure 6:
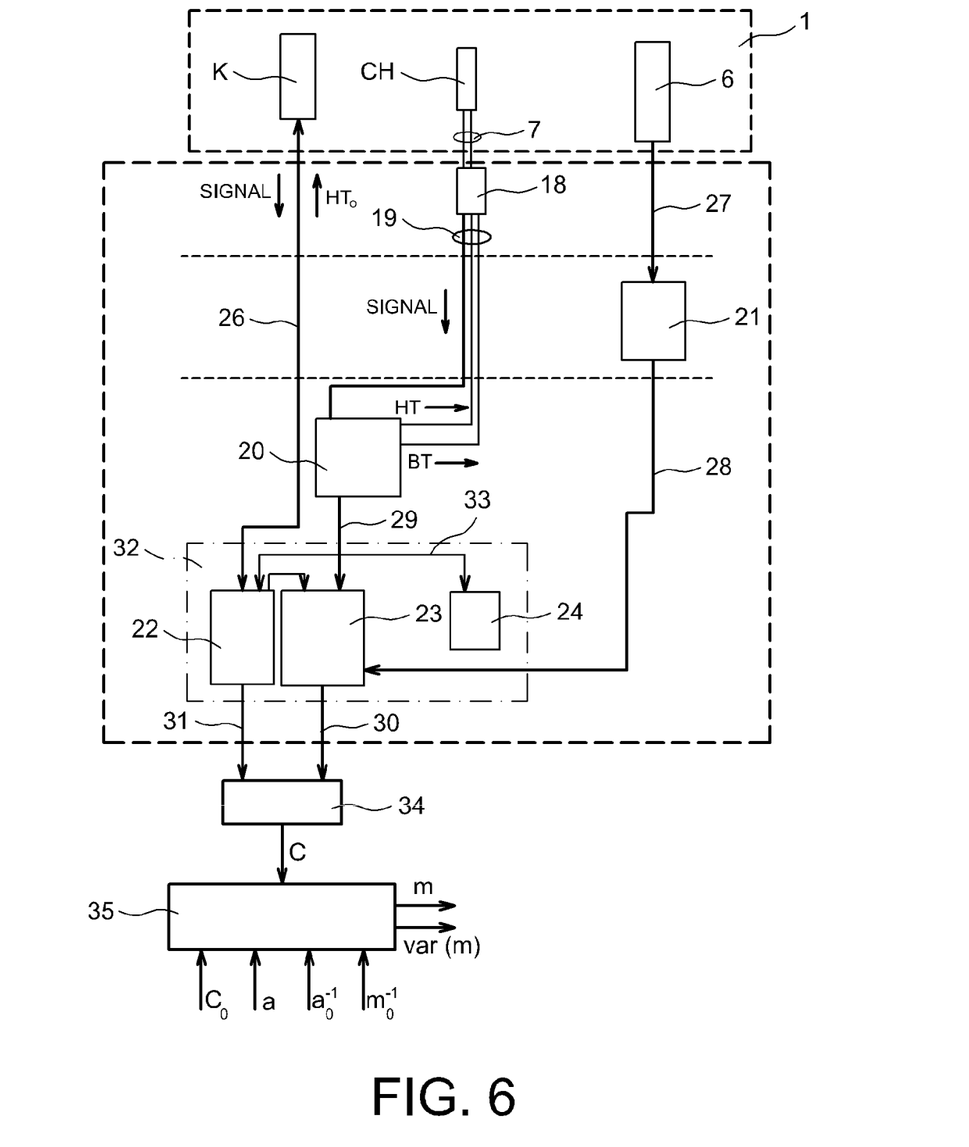
FIG. 6 is a block diagram of a fission chamber calibration device which applies the method of the invention to process measurement signals.

FIG. 6 gives a block diagram of the fission chamber calibration device which uses the method of the invention. In addition to the elements mentioned with reference to FIG. 4, the calibration device comprises a computing circuit 35. The computing circuit 35 e.g. a computer, applies the calculation method of the invention described with reference to FIG. 5.

The effective mass m and associated variance (m) are calculated using the measured count rate C (generally matrix [C]), the measured count rate $C_0$ (generally matrix $[C]_0$) and the known data a, $a_0^{-1}$ and $m_0^{-1}$ (respectively matrices [a], $[a]_0^{-1}$ and $[m]_0^{-1}$ in general).

By way of illustration and validation of the method of the invention, the calibration results are given below which were obtained for fission chambers with the main isotopes: Th-232, U-235, U-238, Np-237, Pu-239, Pu-240, Pu-241, Pu-242 and Am-241. These results were obtained for both configurations (thermal and fast) of the calibration device according to the invention, via active neutron interrogation. They are validated relative to calibrations performed in a reactor. The results obtained in the thermal and fast configurations were also compared and validated with respect to each other. The results are given in Tables 1-11 at the end of the description.

Obtaining Reference Data

Table 1 summarizes all the isotopic compositions of the fission chambers considered. The isotope percentages are standardized relative to that of the main isotope.

The coefficient of variation (i.e. relative uncertainty) on isotope percentage is obtained by feedback from experience on isotope analyses and therefore depends on laboratory and analysis means. For information, the correlation used to determine the coefficient of variation y as a % in relation to isotope percentage x is:

$$y = 0.002406 \, x^{-0.609}$$

The known effective masses of the main isotopes are obtained by reactor calibration for example (see Table 2) allowing determination of the number of nuclei represented by matrix [n] such that:

$$[n][m] \times [a].$$

Results of Primary Calibration

In the fast configuration of the calibration device, the count rates obtained from the primary standard chambers are given in Table 3. They are standardized with respect to the count rate of the Helium3 monitor.

It is to be noted that the $U_{nat}$ n° 3 and Pu-239 n° 6 chambers were not taken into account in the primary standards. They will be used further on to verify the validity of the results obtained with respect to their mass calibrated in a reactor.

Having regard to the above data, it is easy to solve equation (3), hence the result in Table 4 expressed relative to a unit of mass chosen to be 1 µg.

It is ascertained that the relative uncertainty regarding the effective macroscopic cross-sections per unit of mass of all the isotopes is excellent, in the order of 1% to 4%, of which less than 1% derived from measurement reproducibility and about 2% to 3% derived from uncertainties on the masses of the primary standards.

In the thermal configuration of the calibration device, the count rates obtained from the primary standard chambers are given in Table 5. They are standardized relative to the count rate of the Helium3 monitor.

Having regard to the above data, it is easy to solve equation (3), giving the results in Table 6 expressed relative to a unit of mass chosen to be 1 µg.

It is ascertained that the relative uncertainty on the effective macroscopic cross-sections per unit of mass of the fissile isotopes with thermal neutrons is excellent, in the order of 2% to 3%, of which less than 1% derived from measurement reproducibility and about 2% to 3% derived from uncertainties on the masses of the primary standards.

On the other hand, the uncertainty related to the effective macroscopic cross-sections per unit of mass of the non-fissile isotopes with thermal neutrons is high (~10% for Pu-242, ~20% for Pu-240), since the cross-sections of these isotopes are very small, in the order of 100 times smaller than those of Pu-239, Pu-241 and U-235. It is also noted that a zero effective cross-section is found mathematically for U-238.

By way of indication, all these elements indeed prove that the interrogation neutron spectrum of the fission chambers in the thermal configuration of the calibration device is purely thermal.

Secondary Effective Mass Calibration of the Fission Chambers

Table 7 gives the list of fission chambers calibrated for effective mass in the calibration device with fast configuration, and the associated counts and uncertainties.

Table 8 gives the list of fission chambers calibrated for effective mass in the calibration device with thermal configuration, and the associated counts and uncertainties.

Calibration Results with Fast Configuration

The matrix of the isotope compositions and their associated uncertainties being known from Table 1, the effective masses are obtained through equation (1) (see Table 9).

It is ascertained that the uncertainties for calibrated effective masses are in the order of 2% to 3% for the actinides examined (5% for Am-241), and are therefore comparable with those obtained by reactor calibrations.

For the 6 chambers calibrated both in the device with fast configuration ("Dispo") and in a reactor ("Reactor"), a difference $$\frac{Dispo - Reactor}{Reactor}$$

is obtained which is less than the experimental uncertainty (CV (%)). It can therefore be concluded that the results are coherent, which validates the measurements made in the calibration device with fast configuration.

Results of Thermal Configuration Calibrations

The matrix of isotope compositions and their associated uncertainties being known from Table 1, the effective masses are obtained from equation (1) (see Table 10).

It is ascertained that the uncertainties on calibrated effective masses are in the order of 2% to 3% for fissile isotopes with thermal neutrons (U-235, Pu-239), and are therefore comparable with those obtained with reactor calibrations.

For non-fissile isotopes with thermal neutrons (Pu-240 and U-238 in this case) higher uncertainties (of between 5% and 80% depending on the quantity of fissile impurities contained in these deposits of non-fissile main isotopes with thermal neutrons) are observed. These uncertainties are distinctly greater than those observed with calibrations under fast configuration of the calibration device by active neutron interrogation, or with reactor calibrations.

In terms of quality, it is to be noted that the thermal configuration calibrations only allow correct performance levels to be obtained, in terms of accuracy, for the fissile isotopes with thermal neutrons.

Nonetheless, for the 6 chambers calibrated both in the device with thermal configuration ("Dispo") and in a reactor ("Reactor"), a difference $$\frac{Dispo - Reactor}{Reactor}$$

is ascertained that is less than the experimental uncertainty (CV (%)). It can therefore be concluded that the results are coherent, which validates the measurements made in the calibration device with thermal configuration.

Comparison Between Fast and Thermal Configuration Calibrations

Table 11 gives the comparison between the results obtained with the calibration device with thermal and fast configurations.

Excellent agreement is found between the results, the difference at all times being distinctly less than one standard deviation from experimental uncertainty.

TABLE 1

Isotope composition of the fission chambers, as a % of the main isotope

| | Main Isotope | chamber n° | Th232 | U235 | U238 | Np237 | Pu239 | Pu240 | Pu241 | Pu242 | Am241 |
|---|---|---|---|---|---|---|---|---|---|---|---|
| primary standards | Th232 | 1 | 100.00% | 0.00% | 0.00% | 0.00% | 0.00% | 0.00% | 0.00% | 0.00% | 0.00% |
| | U235 | 2 | 0.00% | 100.00% | 1.03% | 0.00% | 0.00% | 0.00% | 0.00% | 0.00% | 0.00% |
| | $U_{nat}$ | 3 | 0.00% | 0.73% | 100.00% | 0.00% | 0.00% | 0.00% | 0.00% | 0.00% | 0.00% |
| | $U_{nat}$ | 4 | 0.00% | 0.73% | 100.00% | 0.00% | 0.00% | 0.00% | 0.00% | 0.00% | 0.00% |

TABLE 1-continued

Isotope composition of the fission chambers, as a % of the main isotope

|  | Main Isotope | chamber n° | Th232 | U235 | U238 | Np237 | Pu239 | Pu240 | Pu241 | Pu242 | Am241 |
|---|---|---|---|---|---|---|---|---|---|---|---|
|  | Np237 | 5 | 0.00% | 0.00% | 0.00% | 100.00% | 0.00% | 0.00% | 0.00% | 0.00% | 0.00% |
|  | Pu239 | 6 | 0.00% | 0.00% | 0.00% | 0.00% | 100.00% | 0.88% | 0.00% | 0.01% | 0.00% |
|  | Pu239 | 7 | 0.00% | 0.00% | 0.00% | 0.00% | 100.00% | 1.42% | 0.01% | 0.00% | 0.05% |
|  | Pu240 | 8 | 0.00% | 0.00% | 0.00% | 0.00% | 0.79% | 100.00% | 0.14% | 0.17% | 0.56% |
|  | Pu241 | 9 | 0.00% | 0.00% | 0.00% | 0.00% | 1.91% | 8.54% | 100.00% | 6.85% | 146.58 |
|  | Pu242 | 10 | 0.00% | 0.00% | 0.00% | 0.00% | 1.04% | 3.14% | 0.34% | 100.00% | 0.34% |
|  | Am241 | 11 | 0.00% | 0.00% | 0.00% | 2.76% | 2.10% | 0.00% | 0.00% | 0.00% | 100.00% |
| chambers to be calibrated | U235 | 12 | 0.00% | 100.00% | 1.03% | 0.00% | 0.00% | 0.00% | 0.00% | 0.00% | 0.00% |
|  | U235 | 13 | 0.00% | 100.00% | 6.35% | 0.00% | 0.00% | 0.00% | 0.00% | 0.00% | 0.00% |
|  | U235 | 14 | 0.00% | 100.00% | 1.43% | 0.00% | 0.00% | 0.00% | 0.00% | 0.00% | 0.00% |
|  | U235 | 15 | 0.00% | 100.00% | 1.43% | 0.00% | 0.00% | 0.00% | 0.00% | 0.00% | 0.00% |
|  | U-238 | 16 | 0.00% | 0.04% | 100.00% | 0.00% | 0.00% | 0.00% | 0.00% | 0.00% | 0.00% |
|  | U-238 | 17 | 0.00% | 0.24% | 100.00% | 0.00% | 0.00% | 0.00% | 0.00% | 0.00% | 0.00% |
|  | Np237 | 18 | 0.00% | 0.00% | 0.00% | 100.00% | 0.00% | 0.00% | 0.00% | 0.00% | 0.00% |
|  | Np237 | 19 | 0.00% | 0.00% | 0.00% | 100.00% | 0.00% | 0.00% | 0.00% | 0.00% | 0.00% |
|  | Pu239 | 20 | 0.00% | 0.00% | 0.00% | 0.00% | 100.00% | 1.42% | 0.01% | 0.00% | 0.05% |
|  | Pu239 | 21 | 0.00% | 0.00% | 0.00% | 0.00% | 100.00% | 0.89% | 0.00% | 0.01% | 0.00% |
|  | Pu239 | 22 | 0.00% | 0.00% | 0.00% | 0.00% | 100.00% | 0.89% | 0.00% | 0.01% | 0.00% |
|  | Pu240 | 23 | 0.00% | 0.00% | 0.00% | 0.00% | 0.79% | 100.00% | 0.14% | 0.17% | 0.56% |
|  | Pu240 | 24 | 0.00% | 0.00% | 0.00% | 0.00% | 0.79% | 100.00% | 0.14% | 0.17% | 0.56% |
|  | Am241 | 25 | 0.00% | 0.00% | 0.00% | 2.70% | 0.21% | 0.06% | 0.00% | 0.00% | 100.00% |

TABLE 2

Masses of primary standard chambers

| main isotope | chamber n° | Mass of main isotope (μg) |
|---|---|---|
| Th232 | 1 | 1009.51 |
| U235 | 2 | 226.22 |
| $U_{nat}$ | 3 | 545.05 |
| $U_{nat}$ | 4 | 401.77 |
| Np237 | 5 | 367.73 |
| Pu239 | 6 | 161.73 |
| Pu239 | 7 | 32.95 |
| Pu240 | 8 | 291.46 |
| Pu241 | 9 | 71.30 |
| Pu242 | 10 | 85.19 |
| Am241 | 11 | 26.58 |

TABLE 3

Counts and associated uncertainties of the primary standard chambers, with fast configuration of the calibration device.

| Main isotope | chamber n° | integral/monitor | CV (%) |
|---|---|---|---|
| Th232 | 1 | 0.00095962 | 0.96% |
| U235 | 2 | 0.012085661 | 0.80% |
| $U_{nat}$ | 4 | 0.001530497 | 0.97% |
| Np237 | 5 | 0.003152641 | 0.92% |
| Pu239 | 7 | 0.001975405 | 0.95% |
| Pu240 | 8 | 0.002678112 | 0.95% |
| Pu241 | 9 | 0.002282691 | 0.95% |
| Pu242 | 10 | 0.000742626 | 1.15% |
| Am241 | 11 | 0.000298685 | 2.83% |

TABLE 4

Column vector [X] of the effective macroscopic integral fission cross-sections per unit of mass (unit of mass of 1 μg) standardized to the monitor, in the fast configuration of the calibration device.

|  | X | uncertainty on X | CV (%) on X |
|---|---|---|---|
| Th232 | 9.51E-07 | 2.73275E-08 | 2.87% |
| U235 | 5.34E-05 | 1.2567E-06 | 2.35% |

TABLE 4-continued

Column vector [X] of the effective macroscopic integral fission cross-sections per unit of mass (unit of mass of 1 μg) standardized to the monitor, in the fast configuration of the calibration device.

|  | X | uncertainty on X | CV (%) on X |
|---|---|---|---|
| U238 | 3.42E-06 | 1.19067E-07 | 3.48% |
| Np237 | 8.57E-06 | 2.4552E-07 | 2.86% |
| Pu239 | 5.98E-05 | 1.44212E-06 | 2.41% |
| Pu240 | 8.63E-06 | 3.43628E-07 | 3.98% |
| Pu241 | 1.53E-05 | 1.1934E-07 | 0.78% |
| Pu242 | 7.74E-06 | 3.19593E-07 | 4.13% |
| Am241 | 9.74E-06 | 4.92311E-07 | 5.05% |

TABLE 5

Counts and associated uncertainties of the primary standard chambers, with thermal configuration of the calibration device.

| main isotope | chamber n° | integral/monitor | CV (%) |
|---|---|---|---|
| U235 | 2 | 1.4262E-02 | 0.42% |
| $U_{nat}$ | 4 | 1.8436E-04 | 1.01% |
| Pu239 | 7 | 2.7746E-03 | 0.75% |
| Pu240 | 8 | 2.5193E-04 | 0.97% |
| Pu241 | 9 | 2.0253E-03 | 0.61% |
| Pu242 | 10 | 1.1311E-04 | 1.29% |
| Am241 | 11 | 8.0131E-05 | 1.62% |

TABLE 6

Column vector [X] of the effective macroscopic integral fission cross-sections per unit of mass (unit of mass of 1 μg) standardized to the monitor, with thermal configuration of the calibration device.

|  | X | CV (%) over X |
|---|---|---|
| U235 | 6.3032E-05 | 2.31% |
| U238 | 0 | — |
| Pu239 | 8.4161E-05 | 2.39% |
| Pu240 | 1.5047E-07 | 21.41% |
| Pu241 | 2.4924E-05 | 3.11% |

TABLE 6-continued

Column vector [X] of the effective macroscopic integral fission cross-sections per unit of mass (unit of mass of 1 μg) standardized to the monitor, with thermal configuration of the calibration device.

|       | X          | CV (%) over X |
|-------|------------|---------------|
| Pu242 | 3.7305E−07 | 10.78%        |
| Am241 | 1.2487E−06 | 6.38%         |

TABLE 7

Counts and associated uncertainties of the chambers to be calibrated, with fast configuration of the calibration device.

| main isotope | chamber n° | integral/monitor | CV (%) |
|---|---|---|---|
| U235 | 12 | 0.007796668 | 0.74% |
| U235 | 13 | 0.006272435 | 0.89% |
| U235 | 15 | 0.001103372 | 1.35% |
| $U_{nat}$ | 3 | 0.001985892 | 0.97% |
| U-238 | 16 | 0.010785962 | 0.72% |
| U-238 | 17 | 0.008568659 | 0.94% |
| Np237 | 18 | 0.00241772 | 0.92% |
| Np237 | 19 | 0.000783753 | 1.11% |
| Pu239 | 20 | 0.001872543 | 0.98% |
| Pu239 | 6 | 0.009859599 | 0.89% |
| Pu239 | 21 | 0.001739992 | 1.02% |
| Pu239 | 22 | 0.005682472 | 0.98% |
| Pu240 | 23 | 0.001289246 | 0.98% |

TABLE 7-continued

Counts and associated uncertainties of the chambers to be calibrated, with fast configuration of the calibration device.

| main isotope | chamber n° | integral/monitor | CV (%) |
|---|---|---|---|
| Pu240 | 24 | 0.00129188 | 0.97% |
| Am241 | 25 | 0.000424661 | 2.12% |

TABLE 8 counts and associated uncertainties of the chambers to be calibrated, with thermal configuration of the calibration device.

| main isotope | chamber n° | integral/monitor | CV (%) |
|---|---|---|---|
| U235 | 12 | 9.2204E−03 | 0.52% |
| U235 | 14 | 8.7994E−02 | 0.18% |
| U235 | 15 | 1.2893E−03 | 0.85% |
| $U_{nat}$ | 5 | 2.4655E−04 | 0.87% |
| U-238 | 16 | 8.2559E−05 | 1.14% |
| U-238 | 17 | 3.7104E−04 | 0.92% |
| Pu239 | 20 | 2.5886E−03 | 0.85% |
| Pu239 | 6 | 1.3617E−02 | 0.43% |
| Pu239 | 21 | 2.3803E−03 | 0.63% |
| Pu239 | 22 | 8.0689E−03 | 0.48% |
| Pu240 | 23 | 1.1742E−04 | 1.03% |
| Pu240 | 24 | 1.1558E−04 | 1.04% |

TABLE 9

Effective masses of the fission chambers in fast configuration.

| isotope | chamber n° | Effective mass in dispo. (μg) | CV (%) | reactor-calibrated mass (μg) | CV (%) | Dispo − Reactor / Reactor | CV (%) |
|---|---|---|---|---|---|---|---|
| U235 | 12 | 145.94 | 2.48% | 140.96 | 2.53% | 3.53% | 3.54% |
| U235 | 13 | 117.01 | 2.52% | / | / | / | / |
| U235 | 15 | 20.65 | 2.72% | / | / | / | / |
| $U_{nat}$ | 3 | 521.32 | 3.32% | 545.05 | 2.60% | −4.35% | 4.22% |
| U-238 | 16 | 3134.19 | 3.55% | / | / | / | / |
| Np237 | 18 | 282.01 | 3.02% | / | / | / | / |
| Np237 | 19 | 91.42 | 3.08% | / | / | / | / |
| Pu239 | 20 | 31.23 | 2.61% | 30.47 | 2.47% | 2.51% | 3.60% |
| Pu239 | 6 | 164.61 | 2.58% | 161.73 | 2.20% | 1.78% | 3.39% |
| Pu239 | 21 | 29.05 | 2.62% | / | / | / | / |
| Pu239 | 22 | 94.87 | 2.61% | / | / | / | / |
| Pu240 | 23 | 140.30 | 3.88% | 137.01 | 3.78% | 2.40% | 5.42% |
| Pu240 | 24 | 140.60 | 3.88% | 133.33 | 3.78% | 5.45% | 5.42% |
| Am241 | 25 | 42.03 | 5.32% | / | / | / | / |

TABLE 10

Effective masses of the fission chambers in thermal configuration.

| isotope | chamber n° | Effective mass in dispo. (μg) | CV (%) | reactor-calibrated mass (μg) | CV (%) | Dispo − Reactor / Reactor | CV (%) |
|---|---|---|---|---|---|---|---|
| U235 | 14 | 1396.25 | 2.33% | / | / | / | / |
| U235 | 12 | 146.30 | 2.38% | 140.96 | 2.53% | 3.79% | 3.47% |
| U235 | 15 | 20.46 | 2.45% | / | / | / | / |
| U-238 | 16 | 2772.07 | 78.01% | / | / | / | / |
| Unat | 3 | 537.47 | 7.36% | 545.05 | 2.60% | −1.39% | 7.80% |
| Pu239 | 6 | 161.78 | 2.44% | 161.73 | 2.20% | 0.03% | 3.29% |
| Pu239 | 20 | 30.74 | 2.54% | 30.47 | 2.47% | 0.89% | 3.54% |
| Pu239 | 21 | 28.27 | 2.46% | / | / | / | / |
| Pu239 | 22 | 95.86 | 2.45% | / | / | / | / |
| Pu240 | 24 | 133.74 | 6.42% | 133.33 | 3.78% | 0.31% | 7.45% |
| Pu240 | 23 | 135.90 | 5.22% | 137.01 | 3.78% | −0.81% | 6.45% |

TABLE 11 comparison between the effective masses obtained in thermal and fast configurations.

| isotope | chamber n° | Effective mass (µg) in thermal configuration | CV (%) | Effective mass (µg) in fast config. | CV (%) | thermal − fast fast | CV (% |
|---|---|---|---|---|---|---|---|
| U235 | 12 | 146.30 | 2.38% | 145.94 | 2.48% | 0.25% | 3.44% |
| U235 | 15 | 20.46 | 2.45% | 20.65 | 2.72% | −0.92% | 3.66% |
| U-238 | 16 | 2772.07 | 78.01% | 3134.19 | 3.55% | −11.55% | 78.09% |
| Unat | 3 | 537.47 | 7.36% | 521.32 | 3.32% | 3.10% | 8.07% |
| Pu239 | 6 | 161.78 | 2.44% | 164.61 | 2.58% | −1.72% | 3.55% |
| Pu239 | 20 | 30.74 | 2.54% | 31.23 | 2.61% | −1.57% | 3.64% |
| Pu239 | 21 | 28.27 | 2.46% | 29.05 | 2.62% | −2.69% | 3.59% |
| Pu239 | 22 | 95.86 | 2.45% | 94.87 | 2.61% | 1.04% | 3.58% |
| Pu240 | 23 | 133.74 | 6.42% | 140.30 | 3.88% | −4.68% | 7.50% |
| Pu240 | 24 | 135.90 | 5.22% | 140.60 | 3.88% | −3.34% | 6.50% |

The invention claimed is:

1. Method performed by a computer and associated measuring equipment to determine the effective masses of N deposits of fissile matter respectively placed in N measurement fission chambers, N being an integer of 1 or more, the method comprising:

A) a first measuring step (E1) during which N count rates are measured of N respective deposits of fissile matter of known effective masses, respectively placed in N calibration fission chambers respectively identical in their outer dimensions to the N measurement fission chambers, to form a matrix $[C]_0$ of count rates of known deposits of fissile matter, each different measured count rate of said N respective deposits of fissile matter of known effective mass being a different coefficient of the matrix $[C]_0$, B) a second measuring step (E2) during which N count rates are measured of N respective deposits of fissile matter placed in the N measurement fission chambers, to form a matrix [C] of count rates of deposits of fissile matter, the second measuring step being conducted under identical measuring conditions to the measuring conditions under which the first measuring step is conducted, each different measured count rate of said N respective deposits of fissile matter placed in the N measurement fission chambers being a different coefficient of the matrix [C], and C) a computing step (E3) to calculate and store, by operations performed within the computer, a data structure representing a column matrix [m] such that:

$$[m] = [C] \cdot I([a] > ([a]_0^{-1} \times [m]_0^{-1} \times [C]_0)),$$

the coefficients of matrix [m] being the effective masses to be determined, the symbols "·I" and "×" respectively being the "matrix division" operator and the "matrix product" operator and the matrices [a], $[a]_0^{-1}$ and $[m]_0^{-1}$ respectively being:

matrix [a], a known matrix of the isotopic analyses associated with the N deposits of fissile matter whose effective masses are to be determined, matrix $[a]_0^{-1}$, an inverse matrix of a known matrix $[a]_0$ of the isotopic analyses associated with the N deposits of fissile matter of known effective masses, matrix $[m]_0^{-1}$, an inverse matrix of a known matrix $[m]_0$ whose coefficients are the known effective masses of the N known deposits of fissile matter.

2. The method according to claim 1, further comprising the step of calculating and storing, by operations performed within the computer, a data structure representing a variance matrix var[m] of matrix [m] such that:

$$var[m] = \{var[C] + [m_{ij}^2] \times (var[a] \times [X_{ij}^2] + [a_{ij}^2] \times var[X])\} \cdot I\{[([a] \times [X])_{ij}^2]\},$$

in which:

var[C] is the variance matrix of matrix C, var[a] is the variance matrix of matrix [a], var[X] is the variance matrix of matrix [X] such that:

$$[X] = [a]_0^{-1} \times [m]_0^{-1} \times [C]_0,$$

$[m_{ij}^2]$ is the matrix consisting of the terms $m_{ij}$ to the power of 2, the terms $m_{ij}$ being the coefficients of matrix [m], i being the index relating to the rows of the matrix and j being the index relating to the columns of the matrix, $[a_{ij}^2]$ is the matrix consisting of the terms $a_{ij}$ to the power of 2, the terms $a_{ij}$ being the coefficients of matrix [a], i being the index relating to the rows of the matrix and j being the index relating to the columns of the matrix, $[X_{ij}^2]$ is the matrix consisting of the terms $X_{ij}$ to the power of 2, the terms $X_{ij}$ being the coefficients of matrix [X], i being the index relating to the rows of the matrix and j being the index relating to the columns of the matrix, $[([a] \times [X])_{ij}^2]$ is the matrix consisting of the terms $([a] \times [X])_{ij}$ to the power of 2, the terms $([a] \times [X])_{ij}$ being the coefficients of the product matrix $[a] \times [X]$, i being the index relating to the rows of the matrix and j being the index relating to the columns of the matrix.

3. The method according to claim 1, wherein N is 1.

4. The method according to claim 1, wherein N is greater than 1.

5. The method according to claim 2, wherein N is 1.

6. The method according to claim 2, wherein N is greater than 1.

\* \* \* \* \*